United States Patent
Kuzuya et al.

(10) Patent No.: US 11,407,392 B2
(45) Date of Patent: Aug. 9, 2022

(54) BRAKING DEVICE FOR VEHICLES

(71) Applicant: ADVICS CO., LTD., Kariya (JP)

(72) Inventors: Ken Kuzuya, Kariya (JP); Yasuhito Ishida, Toyokawa (JP); Tomotaka Asano, Toyota (JP); Takayuki Yamamoto, Nagakute (JP)

(73) Assignee: ADVICS CO., LTD., Kariya (JP)

( * ) Notice: Subject to any disclaimer, the term of this patent is extended or adjusted under 35 U.S.C. 154(b) by 284 days.

(21) Appl. No.: 16/636,656

(22) PCT Filed: Sep. 5, 2018

(86) PCT No.: PCT/JP2018/032942
§ 371 (c)(1),
(2) Date: Feb. 5, 2020

(87) PCT Pub. No.: WO2019/049909
PCT Pub. Date: Mar. 14, 2019

(65) Prior Publication Data
US 2020/0189539 A1    Jun. 18, 2020

(30) Foreign Application Priority Data

Sep. 6, 2017 (JP) .............................. JP2017-171471

(51) Int. Cl.
*B60T 8/32* (2006.01)
*B60T 8/172* (2006.01)
(Continued)

(52) U.S. Cl.
CPC .............. *B60T 8/321* (2013.01); *B60T 8/172* (2013.01); *B60T 13/161* (2013.01); *B60T 13/20* (2013.01);
(Continued)

(58) Field of Classification Search
CPC ........ B60T 8/321; B60T 13/20; B60T 13/161; B60T 2240/00; B60T 8/172; B60T 2250/04; B60T 13/686
See application file for complete search history.

(56) References Cited

U.S. PATENT DOCUMENTS 8,672,419 B2 * 3/2014 Miyazaki ................ B60T 8/885
303/113.4
9,156,457 B2 * 10/2015 Kim ...................... B60T 13/146
(Continued)

FOREIGN PATENT DOCUMENTS

| JP | 2007-283811 A | 11/2007 |
| JP | 2013-60031 A | 4/2013 |
| WO | WO-2018/221476 A1 * | 12/2018 |

OTHER PUBLICATIONS

International Search Report dated Nov. 6, 2018 in PCT/JP2018/032942 filed on Sep. 5, 2018, 1 page.

*Primary Examiner* — Pamela Rodriguez
(74) *Attorney, Agent, or Firm* — Oblon, McClelland, Maier & Neustadt, L.L.P.

(57) ABSTRACT

The braking device for vehicles includes a reduction amount setting part for setting the amount by which to reduce the revolution of a pump motor during maintenance or reduction of controllable differential pressure so that the reduction amount decreases as the probability increases of needing to discharge the brake fluid by pumps, during a period from when a brake controller begins reducing the revolution until the lapse of prescribed time.

4 Claims, 7 Drawing Sheets

(51) Int. Cl.
*B60T 13/16* (2006.01)
*B60T 13/20* (2006.01)
*B60T 13/68* (2006.01)

(52) U.S. Cl.
CPC ......... *B60T 13/686* (2013.01); *B60T 2240/00* (2013.01); *B60T 2250/04* (2013.01)

(56) References Cited

U.S. PATENT DOCUMENTS

| | | | |
|---|---|---|---|
| 2007/0018497 A1* | 1/2007 | Nomura | B60T 8/4059 303/3 |
| 2007/0284936 A1 | 12/2007 | Maki et al. | |
| 2012/0112524 A1* | 5/2012 | Shibata | B60T 13/146 303/10 |
| 2013/0062932 A1 | 3/2013 | Yagashira | |

* cited by examiner

BRAKING DEVICE FOR VEHICLES

TECHNICAL FIELD

The present invention relates to a braking device for vehicles for applying a fluid pressure braking force to wheels by a hydraulic braking unit in accordance with a brake operation amount.

BACKGROUND ART

Conventionally, for example, a braking device for vehicles disclosed in PTL 1 as described below is known. Such a conventional braking device for vehicles includes a regenerative brake device for applying a regenerative braking force; a hydraulic brake device for applying a fluid pressure braking force using a fluid pressure by a pump; and a brake ECU for controlling the hydraulic brake device to cooperate with the regenerative brake device. Also, while the regenerative brake device applies a regenerative braking force and also the hydraulic braking device applies a fluid pressure braking force, the brake ECU reduces a revolution number of a motor for driving the pump if a gradient of a target control fluid pressure braking force to be generated by the hydraulic brake device is decreased or constant.

CITATION LIST

Patent Literature

PTL 1: JP-A-2007-283811

SUMMARY OF INVENTION

Technical Problem

However, in the conventional braking device for vehicles, it is possible to inhibit deterioration of a pump motor by reducing a revolution number of the pump motor when the gradient of the target control fluid pressure braking force to be generated by the hydraulic brake device is decreased or constant, i.e., when an increase in pressure by the pump is not required. However, if a situation where the gradient of the target control fluid pressure braking force is changed from the decreased or constant state to an increased state occurs, an increase in pressure by the pump is required and thus the revolution number of the pump motor has to be increased. In this case, if the pump motor is in a state where the revolution number thereof has excessively been reduced, responsiveness in increasing the revolution number of the pump motor is likely to be decreased. Therefore, in the conventional braking device for vehicles, there is a room for improvement in this regard.

The present invention has been made in order to solve the above problems, and an object thereof is to provide a braking device for vehicles, which achieves both good responsiveness and inhibition of deterioration of a pump motor.

Solution to Problem

In order to solve the above object, the invention according to claim 1 is directed to a braking device for vehicles, including a pump for discharging a brake fluid onto a fluid line between a master cylinder and wheel cylinders of wheels; a pump motor for driving the pump in accordance with a target wheel pressure, which is a target value of wheel pressures in the wheel cylinders; a hydraulic brake unit for applying a control fluid pressure, which is generated from a fluid pressure by the pump, to the wheel cylinders; a fluid pressure control valve for causing a controllable differential pressure, which is generated between a master cylinder side and a wheel cylinder side thereof by the control fluid pressure, to become a maintained state or decreased state; a motor control unit for reducing a revolution number of the pump motor when the controllable differential pressure becomes the maintained state or decreased state by the fluid pressure control valve, wherein the braking device for vehicles further includes a reduction amount setting unit for setting a reduction amount of the revolution number of the pump motor in the maintained state or decreased state of the controllable differential pressure, in such a manner that during a predetermined period of time from a timing, at which the revolution number of the pump motor starts to be reduced by the motor control unit, the reduction amount of the revolution number of the pump motor is decreased as a probability that a brake fluid is required to be discharged by the pump becomes higher.

Advantageous Effects of Invention

Therefore, when the controllable differential pressure becomes the maintained state or decreased state by the fluid pressure control valve, i.e., when an increase in pressure by the pump is not required and also the revolution number of the pump motor is reduced by the motor control unit, the reduction amount setting unit can set the reduction amount of the revolution number, in such a manner that the reduction amount of the revolution number of the pump motor is decreased as the probability that a brake fluid is required to be discharged by the pump becomes higher. Thus, in a situation where there is a high probability that a brake fluid is required to be discharged by the pump, it is possible to satisfactorily enhance responsiveness when increasing the revolution number of the pump motor without excessively decreasing the revolution number of the pump motor. As a result, it is possible to increase the control fluid pressure by the pump with good responsiveness and thus to quickly apply the wheel pressure to the wheel cylinders. Further, in a situation where there is a low probability that a brake fluid is required to be discharged by the pump, it is possible to limit the revolution number of the pump motor and thus to appropriately inhibit deterioration of the pump motor by setting the reduction amount of the pump motor to be larger.

DESCRIPTION OF EMBODIMENTS

Hereinafter, an embodiment of a braking device for vehicles according to the present invention will be described in detail with reference to the accompanying drawings. Meanwhile, in the following embodiment and modifications thereof, the same or like parts are denoted by the same reference numerals in the figures. Also, it should be noted that the figures used for explanation are conceptual diagrams and the shape of each part may not always be exact.

Figure 1:
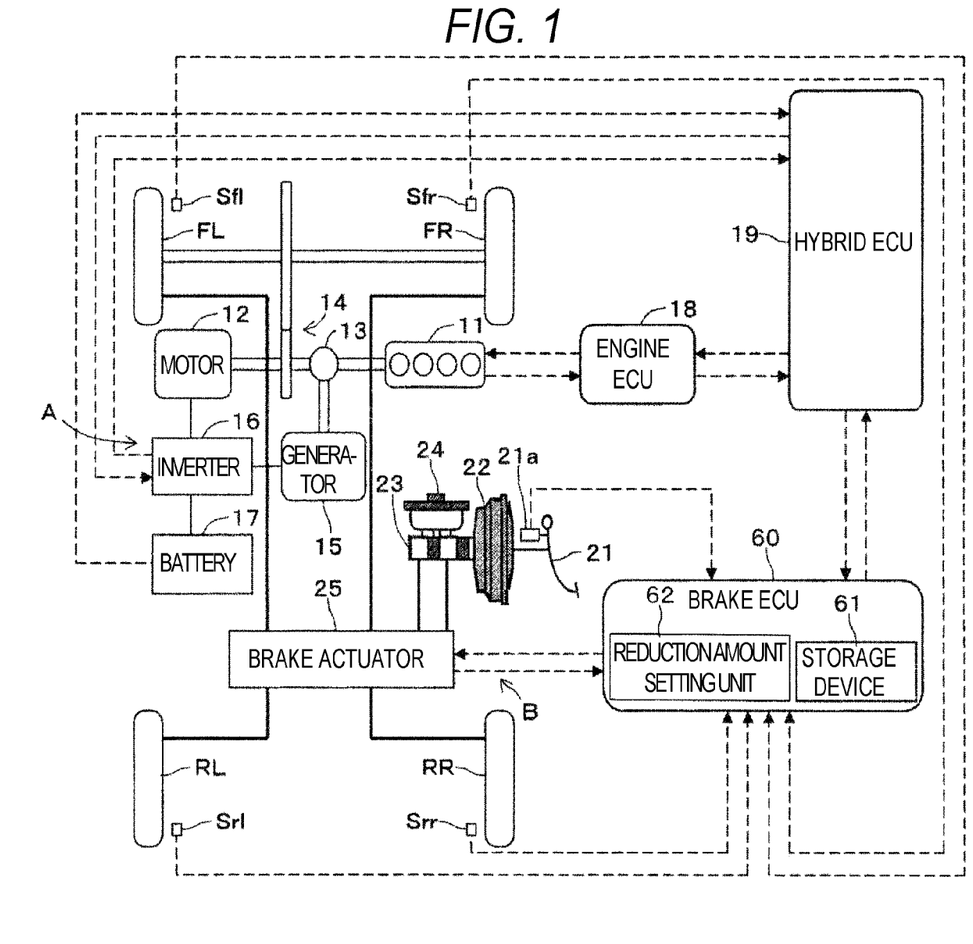
FIG. 1 is a view showing a configuration of a vehicle applied with a braking device for vehicles according to an embodiment of the present invention.

As shown in FIG. 1, the braking device for vehicles is applied to a hybrid vehicle. The hybrid vehicle is a vehicle, in which driving wheels thereof, e.g., left and right front wheels FL, FR are driven by a hybrid system. The hybrid system is a powertrain using a combination of two types of power sources including an engine 11 and a motor 12. For the present embodiment, the hybrid system is a parallel hybrid system, in which both the engine 11 and the motor 12 directly drive the wheels. On the other hand, as the hybrid system, a serial hybrid system is also known in addition to the parallel hybrid system. In the serial hybrid system, the wheels are driven by the motor 12, and the engine 11 acts as an electric power source for the motor 12.

For a hybrid vehicle equipped with a parallel hybrid system, a driving power of the engine 11 is transmitted to the driving wheels (in the present embodiment, left and right front wheels FL, FR) via a power split mechanism 13 and a power split mechanism 14. The power split mechanism 13 is configured to appropriately split a driving power of the engine 11 into a driving power for the vehicle and a driving power for a generator. The power split mechanism 14 is configured to appropriately combine and transmit driving powers from the engine 11 and the motor 12 to the driving wheels according to travel conditions. The power split mechanism 14 adjusts a ratio of driving powers, which are transmitted from the engine 11 and the motor 12, between 0:100 and 100:0. Meanwhile, the power split mechanism 14 has a transmission mechanism.

The motor 12 is configured to assist an output power of the engine 11 to increase a driving power and also to generate electricity during braking of the vehicle to charge a battery 17. A generator 15 is configured to generate electricity by the output power of the engine 11 and also to function as a starter upon start of the engine 11. The motor 12 and the generator 15 are electrically connected to an inverter 16. The inverter 16 is electrically connected to the battery 17 as a direct current power source and is configured to convert an alternating current power inputted from the motor 12 and the generator 15 into a direct current power and then to supply the direct current power to the battery 17, or to convert a direct current power from the battery 17 into an alternating current power and then to output the alternating current power to the motor 12 and the generator 15.

In the present embodiment, a regenerative brake device A as a regenerative brake unit is constituted of the motor 12, the inverter 16 and the battery 17. The regenerative brake device A is configured to generate a regenerative braking force on any of wheels FL, FR, RL, RR (in the present embodiment, left and right front wheels FL, FR driven by the motor 12 as a driving source) based on a brake operation amount detected by a brake operation amount detection unit.

For the present embodiment, the brake operation amount is an amount of operation on a brake pedal 21 and includes, for example, a stroke amount of the brake pedal 21, a depression force on the brake pedal 21, a master cylinder pressure correlated to the depression force and the like. The brake operation amount detection unit is configured to detect the brake operation amount and includes a pedal stroke sensor 21a for detecting a stroke amount of the brake pedal 21, a pressure sensor P for detecting a master cylinder pressure and the like.

The engine 11 is controlled by an engine ECU (Electronic Control Unit) 18. The engine ECU 18 is configured to output an opening degree command to an electronic control throttle (not shown) in accordance with a required engine output value from a hybrid ECU (Electronic Control Unit) 19, as described below, and thus to adjust a revolution number of the engine 11.

The hybrid ECU 19 is connected to the inverter 16 to be communicable with each other. The hybrid ECU 19 is configured to derive a required engine output, a motor torque and a generator torque required based on an accelerator opening degree and a shift position (the shift position is calculated from a shift position signal inputted from a shift position sensor, not shown) and then to send the derived required engine output value to the engine ECU 18 to control a driving power of the engine 11. Also, the hybrid ECU 19 controls the motor 12 and the generator 15 via the inverter 16 in accordance with the derived required motor torque value and required generator torque value. Further, the hybrid ECU 19 is connected with the battery 17 and is configured to monitor a charged state of the battery 17, a charging current thereto and the like. In addition, the hybrid ECU 19 is also connected with an accelerator opening degree sensor (not shown), which is attached to an accelerator pedal (not shown) to detect an accelerator opening degree of the vehicle, and thus an accelerator opening degree signal from the accelerator opening degree sensor is inputted thereto.

Also, the hybrid vehicle includes a hydraulic brake device B as a hydraulic brake unit for directly applying a hydraulic braking force on each of the wheels FL, FR, RL, RR to brake the vehicle. As mainly shown in FIG. 2, the hydraulic brake device B is configured to generate a base fluid pressure, which corresponds to a brake operation amount by depression of the brake pedal 21, by a master cylinder 23. Also, the hydraulic brake device B can directly apply the generated base fluid pressure on wheel cylinders WC1, WC2, WC3, WC4 of the respective wheels FL, FR, RL, RR connected to the master cylinder 23 via fluid lines Lf, Lr, in which respective fluid pressure control valves 31, 41 (master cut valves: SM valves 31, 41) are interposed. Thus, the hydraulic brake device B is capable of generating a base fluid pressure braking force corresponding to the base fluid pressure on each of the wheels FL, FR, RL, RR. In addition, although not shown, the base fluid pressure generated by the master cylinder 23 may be supplied to a stroke simulator.

Figure 2:
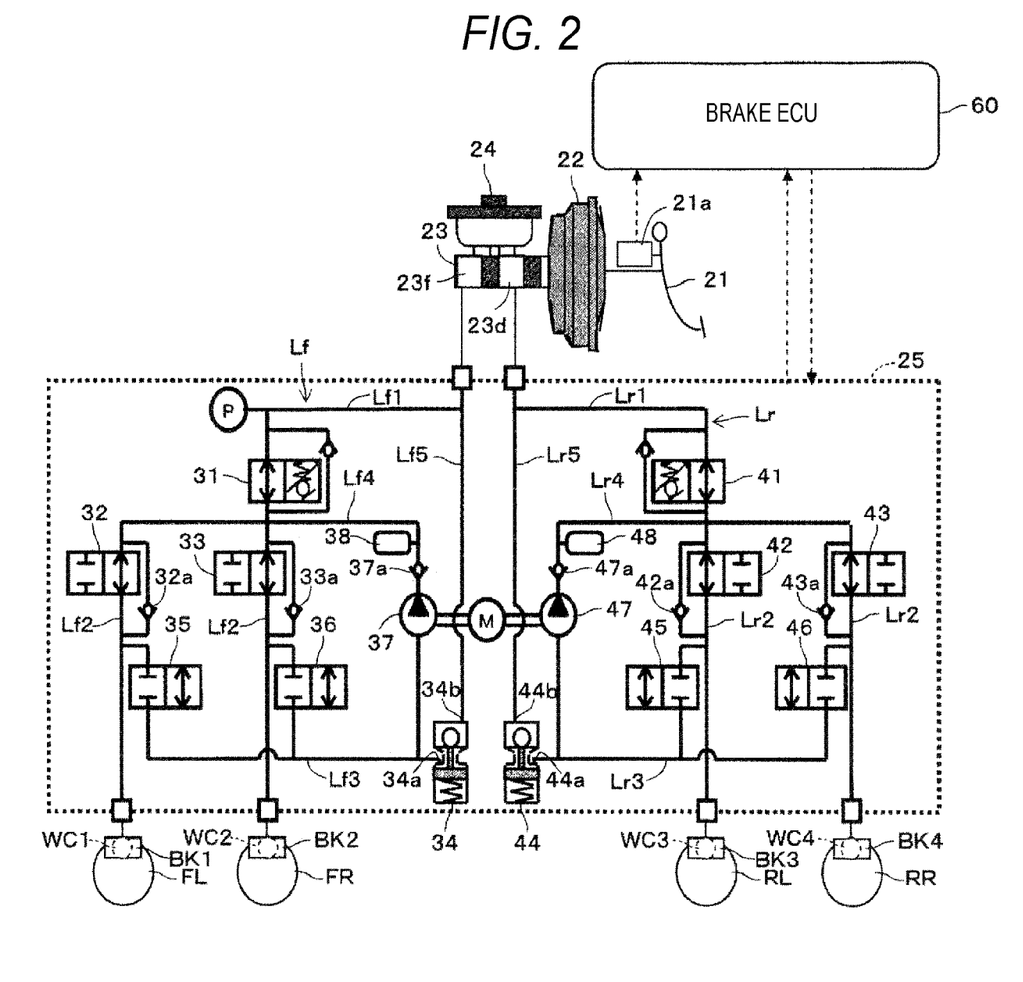
FIG. 2 is a view showing a hydraulic brake device in FIG. 1.

Further, the hydraulic brake device B is configured to apply a control fluid pressure on the wheel cylinders WC1, WC2, WC3, WC4. Here, the control fluid pressure is generated by driving pumps 37, 47 and controlling the fluid pressure control valves 31, 41, independently of the base fluid pressure corresponding to the brake operation amount. Therefore, the hydraulic brake device B is configured to be capable of generating a control fluid pressure braking force on each of the wheels FL, FR, RL, RR.

The hydraulic brake device B includes a negative pressure booster 22, which is a booster for boosting (increasing) a brake operation force generated by depression of the brake pedal 21 by applying an intake negative pressure of the engine 11 to a diaphragm; the master cylinder 23 configured to generate a brake fluid (fluid) having a base fluid pressure corresponding to the brake operation force (i.e., an operated state of the brake pedal 21) boosted by the negative pressure booster 22, and then to supply the brake fluid to the wheel cylinders WC1 to WC4; a reservoir tank 24 for storing a brake fluid and supplying the brake fluid to the master cylinder 23; and a brake actuator (control fluid pressure braking force generation device) 25 provided between the master cylinder 23 and the wheel cylinders WC1 to WC4 to generate a control fluid pressure. On the other hand, the brake pedal 21, the negative pressure booster 22, the master cylinder 23 and the reservoir tank 24 constitute a base fluid pressure braking force generation device.

A brake piping of the hydraulic brake device B of the present embodiment is configured in a front-rear piping manner, so that as shown in FIG. 2, first and second hydraulic chambers 23d, 23f of the master cylinder 23 are connected to the fluid lines Lr, Lf, respectively. The fluid line Lr is configured to communicate the first hydraulic chamber 23d with the wheel cylinders WC3, WC4 of left and right rear wheels RL, RR, and the fluid line Lf is configured to communicate the second hydraulic chamber 23f with the wheel cylinders WC1, WC2 of left and right front wheels FL, FR.

If wheel pressures Pwc1, Pwc2, Pwc3, Pwc4 (control fluid pressure or base fluid pressure) are supplied to the respective wheel cylinders WC1, WC2, WC3, WC4, brake units BK1, BK2, BK3, BK4 provided for the respective wheel cylinders WC1, WC2, WC3, WC4 are operated to generate a fluid pressure braking force on each of the wheels FL, FR, RL, RR. The brake units BK1, BK2, BK3, BK4 include a disk brake, a drum brake or the like. In this case, a frictional member, such as a brake pad or a brake shoe, limits rotation of a disk rotor, a brake drum or the like rotated integrally with a wheel.

Next, the brake actuator 25 will be described in detail with reference to FIG. 2. The brake actuator 25 is widely known and is constructed by packaging the fluid pressure control valves 31, 41, pressure increase control valves 32, 33, 42, 43, pressure decrease control valves 35, 36, 45, 46 as electromagnetic valves, pressure adjustment reservoirs 34, 44, the pumps 37, 47, a pump motor M, and so on into a single case.

First, the front wheel-side configuration of the brake actuator 25 will be described. In the fluid line Lf (on the fluid line), the fluid pressure control valve 31 (electromagnetic valve) configured as a differential pressure control valve is provided. The fluid pressure control valve 31 is controlled to be switched between a differential pressure generation state and a differential pressure elimination state by a brake ECU (Electronic Control Unit) 60 as a control fluid pressure braking force control unit. In the present embodiment, the fluid pressure control valve 31 is normally in a closed state, and as the control fluid pressure is increased, can become the differential pressure generation state where a fluid line Lf2 of the wheel cylinder WC1, WC2 side thereof has a higher pressure than that of a fluid line Lf1 of the master cylinder 23 side thereof by a controllable differential pressure. On the other hand, as the control fluid pressure is maintained or decreased, the fluid pressure control valve 31 can become the differential pressure elimination state where the fluid line Lf2 of the wheel cylinders WC1, WC2 side and the fluid line Lf1 of the master cylinder 23 side have substantially the same pressure. Such a controllable differential pressure is adjusted in accordance with a control current by the brake ECU 60. Meanwhile, in the differential pressure elimination state, the control fluid pressure can be maintained or decreased by communicating the pressure decrease control valves 35, 36 with the pressure adjustment reservoir and thus circulating a brake fluid from the pump 37 therethrough.

The fluid line Lf2 is branched into two parts. Here, one part is provided with the pressure increase control valve 32 for controlling an increase in brake fluid pressure for the wheel cylinder WC1 in a pressure increase mode, whereas the other part is provided with the pressure increase control valve 33 for controlling an increase in brake fluid pressure for the wheel cylinder WC2 in the pressure increase mode. The pressure increase control valves 32, 33 are configured as a two-position valve controlled to a communicated state or an interrupted state by the brake ECU 60. Also, when the pressure increase control valves 32, 33 have been controlled into the communicated state, the control fluid pressure generated by driving the pump 37 and controlling the fluid pressure control valve 31, and/or the base fluid pressure of the master cylinder 23 can be applied to the wheel cylinders WC1, WC2.

Also, parts of the fluid lines Lf2, which are located between the pressure increase control valves 32, 33 and the respective wheel cylinders WC1, WC2, are communicated with a reservoir hole 34a of the pressure adjustment reservoir 34 via a fluid line Lf3. The fluid line Lf3 is provided with the pressure decrease control valves 35, 36 controlled to a communicated state or an interrupted state by the brake ECU 60. The pressure decrease control valves 35, 36 are configured to become appropriately the communicated state by the brake ECU 60 so that the brake fluid is discharged to the pressure adjustment reservoir 34 via the fluid line Lf3, thereby controlling a decrease in the wheel pressures Pwc1, Pwc2 of the respective wheel cylinders WC1, WC2.

Also, a fluid line Lf4 connecting the fluid line Lf2, which is located between the fluid pressure control valve 31 and the pressure increase control valves 32, 33, with the reservoir hole 34a of the pressure adjustment reservoir 34 is provided with the pump 37 together with a safety valve 37a to be arranged in parallel to the fluid pressure control valve 31. Further, a fluid line Lf5 is provided to connect the reservoir hole 34a of the pressure adjustment reservoir 34 with the master cylinder 23 via the fluid line Lf1. The pump 37 is driven by the pump motor M in accordance with a command of the brake ECU 60. Therefore, the pump 37 sucks in a brake fluid in the master cylinder 23 via the fluid lines Lf1, Lf5 and the pressure adjustment reservoir 34 and then discharges the brake fluid to the respective wheel cylinders WC1, WC2 via the fluid line Lf4, Lf2 and the pressure increase control valves 32, 33, which are in the communicated state, thereby applying the control fluid pressure thereon. Meanwhile, in order to alleviate a pulsation of the brake fluid discharged from the pump 37, a damper 38 is arranged on the fluid line Lf4 upstream of the pump 37.

Also, the fluid line Lf1 is provided with a pressure sensor P for detecting a master cylinder pressure, which is a pressure of a brake fluid in the master cylinder 23. A detection signal of the pressure sensor P can be sent to the brake ECU 60. Alternatively, the pressure sensor P may be provided on a fluid line Lr1. The master cylinder pressure indicates one of the brake operation amounts.

As another brake operation amount, a pedal stroke of the brake pedal 21 is employed. The pedal stroke is detected by a pedal stroke sensor 21a attached on the brake pedal 21. A detection signal of the pedal stroke sensor 21a can be sent to the brake ECU 60. Alternatively, although both the pressure sensor P and the pedal stroke sensor 21a are shown in FIGS. 1 and 2, only one of the pressure sensor P and the pedal stroke sensor 21a may be equipped in a vehicle.

Also, the rear wheel-side configuration of the brake actuator 25 is similar to the front wheel-side configuration as described above, and accordingly, the fluid line Lr constituting the rear wheel-side configuration is constituted of fluid lines Lr1 to Lr5 like the fluid line Lf. The fluid line Lr is provided with the fluid pressure control valve 41, like the fluid pressure control valve 31, and the pressure adjustment reservoir 44, like the pressure adjustment reservoir 33. The fluid lines Lr2, Lr2 branched to be communicated with the respective wheel cylinders WC3, WC4 are provided with the pressure increase control valves 42, 43, respectively, like the pressure increase control valves 32, 33, and the fluid line L3 is provided with the pressure decrease control valves 45, 46 like the pressure decrease control valves 35, 36. The fluid line Lr4 is provided with the pump 47, a safety valve 47a and a damper 48, like the pump 47, the safety valve 37a and the damper 38, respectively. In addition, the pressure increase control valves 42, 43 are in parallel provided with safety valves 42a, 43a, respectively, like safety valves 32a, 33a.

Therefore, the control fluid pressure generated by driving the pumps 37, 47 and controlling the fluid pressure control valves 31, 41 can be applied to the wheel cylinders WC1, WC2, WC3, WC4 of the respective wheels FL, FR, RL, RR, thereby generating the control fluid pressure braking force on the respective wheels FL, FR, RL, RR.

Also, as shown in FIG. 1, the braking device for vehicles includes wheel speed sensors Sfl, Sfr, Srl, Srr. The wheel speed sensors Sfl, Sfr, Srl, Srr are provided near to the respective wheels FL, FR, RL, RR and are configured to send a pulse signal, which has a frequency corresponding to rotation of the respective wheels FL, FR, RL, RR, to the brake ECU 60. Here, the brake ECU 60 can detect a vehicle speed V from the pulse signal (wheel speed) of the wheels FL, FR, RL, RR detected by the respective wheel speed sensors Sfl, Sfr, Srl, Srr, for example, by using an averaging process and the like.

Further, the braking device for vehicles includes the brake ECU 60 connected with the wheel speed sensors Sfl, Sfr, Srl, Srr, the pressure sensor P, the control vales 31, 32, 33, 35, 36, 41, 42, 43, 45, 46, and the pump motor M. The brake ECU 60 has a microcomputer (not shown), and the microcomputer includes a CPU, ROMs, RAMs and input/output interfaces (all not shown) connected with each other via a bus.

The brake ECU 60 (specifically, CPU) is configured to execute a program, as described below and shown in FIGS. 3 and 4, stored in the ROM, based on detection signals from the above sensors and an actual regeneration execution value from the hybrid ECU 19. Thus, the brake ECU 60 can control the pump motor M of the hydraulic brake device B and control switching of the states of the control valves 31, 32, 33, 35, 36, 41, 42, 43, 45, 46 of the hydraulic brake device B (or control energization thereto), thereby controlling the control fluid pressure to be applied to the wheel cylinders WC1 to WC4, i.e., the control fluid pressure braking force to be applied to the respective wheels FL, FR, RL, RR.

The brake ECU 60 has a storage device 61 previously stored with a map, table or calculation equation representing relationships between a brake operation amount, which is a master cylinder pressure (or a stroke of the brake pedal 21), and a target total braking force (i.e., target deceleration) to be applied to the wheels FL, FR, RL, RR in accordance with the brake operation amount. Also, the storage device 61 is previously stored with a map, table or calculation equation representing a relationship between a brake operation amount, which is a master cylinder pressure, and a control fluid pressure braking force (and also a base fluid pressure braking force) to be applied to the wheels FL, FR, RL, RR in accordance with the brake operation amount. Further, the storage device 61 is previously stored with a map, table or calculation equation representing a relationship between a brake operation amount, which is a master cylinder pressure, and a target regenerative braking force to be applied to the wheels FL, FR, RL, RR in accordance with the brake operation amount.

Further, the brake ECU 60 is communicably connected with the hybrid ECU 19 and is configured to execute a cooperative control of the regenerative brake, which is performed by the motor 12, and the hydraulic brake in such a manner that a total braking force on the vehicle becomes equal to that on a vehicle, which has only a hydraulic brake. Specifically, the brake ECU 60 outputs as the target regenerative braking force of the regenerative brake device A, a required regeneration value, which is a portion of the total braking portion allotted to the regenerative brake device A, to the hybrid ECU 19 depending on a braking degree required by a driver, i.e., the brake operation amount.

Further, the brake ECU 60 operates as a motor control unit for controlling a revolution number of the pump motor M upon controlling operation of the hydraulic brake device B as described below. Therefore, as shown in FIG. 1, the brake ECU 60 has a reduction amount setting unit 62. As described in detail below, the reduction amount setting unit 62 is configured to set an amount of reduction of the revolution number of the pump motor M in accordance with maintaining or decreasing of the controllable differential pressure, in such a manner that during a certain period of time from a timing, at which the revolution number of the pump motor M starts to be reduced, the amount of reduction of the revolution number of the pump motor M is decreased as a probability that a brake fluid is required to be discharged by the pumps 37, 47.

The hybrid ECU 19 derives an actual regeneration execution value to be acted as an actual regenerative brake based on the target regenerative braking force inputted thereto and additionally in consideration of the vehicle speed V, the charged state of the battery 17 or the like. Then, the hybrid ECU 19 controls the motor 12 via the inverter 16 to generate a regenerative braking force corresponding to the derived actual regeneration execution value and also outputs the derived actual regeneration execution value to the brake ECU 60.

Next, a basic operation of the braking device for vehicles configured as described above will be described. Every elapse of the predetermined short period of time, a master cylinder pressure from the pressure sensor P (or a pedal stroke from the pedal stroke sensor 21*a*), which is a brake operation amount, is inputted to the brake ECU 60. Then, the brake ECU 60 calculates a target total braking force Ftb*(n) and a target regenerative braking force Frb*(n) corresponding to the master cylinder pressure based on the map previously stored therein. The regenerative brake device A applies a regenerative braking force corresponding to the target regenerative braking force Frb*(n). Meanwhile, the target regenerative braking force Frb*(n) corresponds to a target deceleration Gd to be generated on the vehicle in accordance with the brake operation amount.

Also, the brake ECU 60 applies a control fluid pressure braking force, in addition to the regenerative braking force. That is, the brake ECU 60 calculates a difference between the target total braking force Ftb*(n) and the target regenerative braking force Frb*(n) as a target control fluid pressure braking force Fcfb*(n). Meanwhile, the target control fluid pressure braking force Fcfb*(n) corresponds to a target wheel pressure (target value) of the wheel cylinders WC1 to WC4. Thus, the hydraulic brake device B applies a control fluid pressure braking force corresponding to the target control fluid pressure braking force Fcfb*(n), and the regenerative brake device A applies a regenerative braking force corresponding to the target regenerative braking force Frb*(n). Therefore, the total braking force obtained by adding the control fluid pressure braking force and the regenerative braking force is applied to the wheels FL, FR, RL, RR. Alternatively, in addition to or instead of the control fluid pressure braking force, the hydraulic brake device B may apply a base fluid pressure braking force corresponding to the master cylinder pressure to the wheels FL, FR, RL, RR.

Next, control of the control fluid pressure braking force in the braking device for vehicles configured as described above will be described with reference to flow charts in FIGS. 3 and 4. Meanwhile, in the following description, a case where the total braking force is constituted of the control fluid pressure braking force and the regenerative braking force and also the actual regenerative braking force is insufficient relative to the target regenerative braking force Frb*(n) will be described by way of example. Here, the insufficient amount is compensated by the control fluid pressure braking force.

Figure 3:
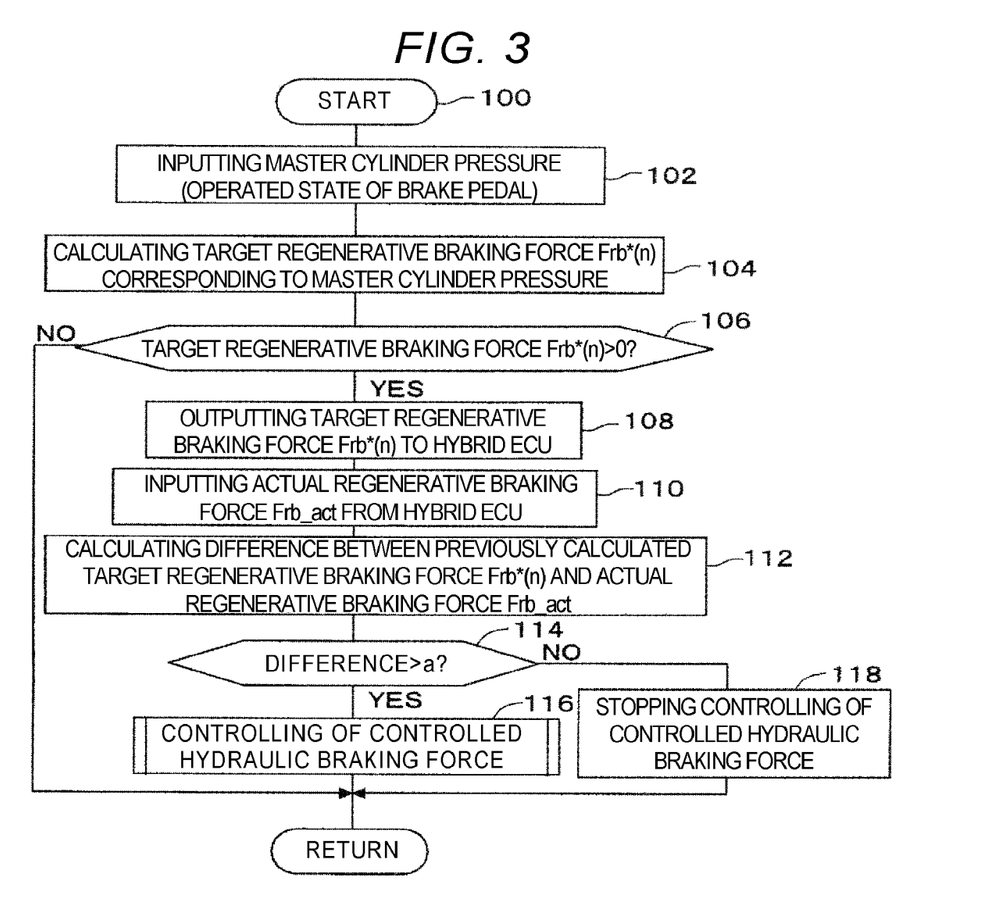
FIG. 3 is a flow chart of a program executed by a brake ECU shown in FIG. 1.

For example, when an ignition switch of the vehicle (not shown) is turned on, the brake ECU 60 starts, at a step S100, to execute a cooperative control program shown in FIG. 3 every the predetermined short period of time. If execution of the cooperative control program is started at the step S100, a master cylinder pressure from the pressure sensor P (or a pedal stroke from the pedal stroke sensor 21*a*), which is a brake operation amount, is inputted to the brake ECU 60 at the next step S102, and then the brake ECU 60 proceeds to a step S104.

At the step S104, the brake ECU 60 calculates a target regenerative braking force Frb*(n) corresponding to the master cylinder pressure inputted at the step S102. Specifically, the brake ECU 60 calculates the target regenerative braking force Frb*(n), using the previously stored map, table or calculation equation representing the relationship between the master cylinder pressure (or the pedal stroke), i.e., the brake operation amount and the target regenerative braking force to be applied to the wheels FL, FR, RL, RR. If the target regenerative braking force Frb*(n) is calculated, then the brake ECU 60 proceeds to a step S106.

At the step S106, the brake ECU 60 determines whether or not the target regenerative braking force Frb*(n) calculated at the step S104 is larger than "0". That is, if the target regenerative braking force Frb*(n) is larger than "0", the brake ECU 60 determines "YES" and then proceeds to a step S108. On the other hand, if the target regenerative braking force Frb*(n) is "0", the brake ECU 60 determines "NO" and then ends execution of the cooperative control program for the moment.

At the step S108, the brake ECU 60 outputs the target regenerative braking force Frb*(n) calculated at the step S104 to the hybrid ECU 19. Thus, a required regeneration value indicative of the target regenerative braking force Frb*(n) is inputted to the hybrid ECU 19, and then the hybrid ECU 19 controls the motor 12 via the inverter 16 based on the required regeneration value and also in consideration of the vehicle speed V, the charged state of the battery or the like, thereby generating a regenerative braking force. Therefore, when the brake pedal 21 is depressed (the brake is operated) so that the target control fluid pressure braking force Fcfb*(n) is "0" and also the target regenerative braking force Frb*(n) is larger than "0", the regenerative braking force is applied to any of the wheels FL, FR, RL, RR (in the present embodiment, left and right front wheels FL, FR). Then, the hybrid ECU 19 outputs an actual regeneration execution value to the brake ECU 60. Here, the actual regeneration execution value indicates an actual regenerative braking force Frb_act(n), which has actually been applied to any of the wheels FL, FR, RL, RR by the regenerative brake device A.

At a step S110, the actual regeneration execution value (that is, actual regenerative braking force Frb_act(n)) outputted from the hybrid ECU 19 is inputted to the brake ECU 60, and then the brake ECU 60 proceeds to a step S112. At the step S112, the brake ECU 60 calculates a difference between the target regenerative braking force Frb*(n) calculated at the step S104 and the actual regenerative braking force Frb_act(n) inputted at the step S110, and then proceeds to a step S114.

At the step S114, the brake ECU 60 determines whether or not the difference calculated at the step S112 is larger than a predetermined value a, namely whether or not the regenerative braking force has been changed. That is, if the calculated difference is larger than the predetermined value a, this means that the regenerative braking force has been changed and thus the actual regenerative braking force Frb_act(n) is smaller than the target regenerative braking force Frb*(n). As a result, a control fluid pressure braking force by the hydraulic brake device B is required. In this case, the brake ECU 60 determines "YES" and then proceeds to a step S116. On the other hand, if the calculated difference is equal to or smaller than the predetermined value a, this means that the regenerative braking force has not been changed and thus the target regenerative braking force Frb*(n) is achieved by the actual regenerative braking force Frb_act(n). As a result, a control fluid pressure braking force by the hydraulic brake device B is not required. In this case, the brake ECU 60 determines "NO" and then proceeds to a step S118.

If a change in the regenerative braking force is detected at the step S114, the brake ECU 60 executes controlling of the control fluid pressure braking force at the step S116. Specifically, the brake ECU 60 (more particularly, the reduction amount setting unit 62) executes a sub-routine for controlling of the control fluid pressure braking force as shown in FIG. 4. Hereinafter, the sub-routine for controlling of the control fluid pressure braking force will be described in detail.

The brake ECU 60 (reduction amount setting unit 62) starts at a step 200 to execute the sub-routine for controlling of the control fluid pressure braking force and then determines at a step S202 whether or not the fluid pressure control valves 31, 41 are in the differential pressure elimination state, in which the controllable differential pressure is maintained or decreased. That is, if the fluid pressure control valves 31, 41 are in the differential pressure elimination state, the brake ECU 60 determines "YES" and then executes each step processing subsequent to a step S204. Meanwhile, in the present embodiment, the differential pressure elimination state is determined for both the fluid pressure control valves 31, 41. However, as described above, in the present embodiment, the left and right front wheels FL, FR are driven by the motor 12. Therefore, the differential pressure elimination state may be determined for only the fluid pressure control valve 31.

On the other hand, if the fluid pressure control valve 31 is not in the differential pressure elimination state, i.e., if the fluid pressure control valves 31, 41 are in the differential pressure generation state, the brake ECU 60 determines "NO" and then proceeds to the step S212 to apply the control fluid pressure braking force. Specifically, at the step S212, the brake ECU 60 calculates a target control fluid pressure braking force Fcfb*(n), which is a control fluid pressure command value and corresponds to the target wheel pressure. That is, the brake ECU 60 sets the difference calculated at the step S112 as the target control fluid pressure braking force Fcfb*(n). Then, the brake ECU 60 sets a revolution number of the pump motor M to a revolution number Nd corresponding to the target control fluid pressure braking force Fcfb*(n), i.e., the control fluid pressure command value. In this case, the brake ECU 60 determines the revolution number Nd of the pump motor M corresponding to the target control fluid pressure braking force Fcfb*, using the previously stored map, table or calculation equation representing the relationship between the revolution number and the target control fluid pressure braking force Fcfb*.

Therefore, if the fluid pressure control valves 31, 41 are in the differential pressure generation state, the brake ECU 60 controls the pumps 37, 47 and the fluid pressure control valves 31, 41, and thus the hydraulic brake device B applies a portion of the total braking force, which corresponds to the control fluid pressure braking force, to the wheels FL, FR, RL, RR. Then, after ending execution of the sub-routine for controlling of the control fluid pressure braking force, the brake ECU 60 returns to the cooperative control program and then ends execution of the program for the moment.

Figure 4:
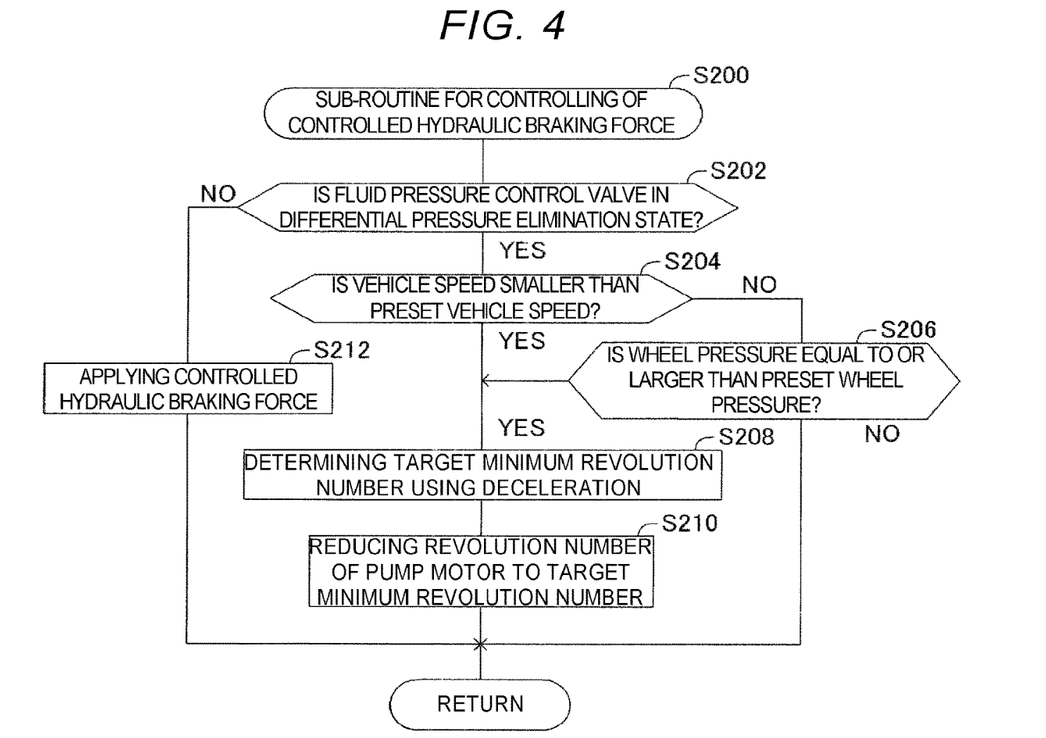
FIG. 4 is a flow chart of the program (sub-routine) executed by the brake ECU shown in FIG. 1.

Again returning to the sub-routine for controlling of the control fluid pressure braking force in FIG. 4, at the step S204, the vehicle speed V of the vehicle is inputted to the brake ECU 60 and then the brake ECU 60 determines whether or not the vehicle speed V of the vehicle is smaller than a preset vehicle speed Vo. Herein, the preset vehicle speed Vo is set to a magnitude when a vehicle speed has been decelerated to some extent by applying the regenerative braking force (and the base fluid pressure braking force) to the wheels FL, FR, RL, RR. Alternatively, the vehicle speed V may be detected by a vehicle speed sensor, not shown.

If the vehicle speed V is smaller than the preset vehicle speed Vo, i.e., if a first condition has been satisfied, the brake ECU 60 determines "YES" and then proceeds to a step S208. On the other hand, if the vehicle speed V is equal to or larger than the preset vehicle speed Vo, i.e., if the first condition has not been satisfied, the brake ECU 60 determines "NO" and then proceeds to a step S206.

Herein, the situation where the first condition has been satisfied is a situation where the vehicle speed V of the vehicle has been reduced to be smaller than the preset vehicle speed Vo (smaller than the preset vehicle speed). In this situation, the regenerative braking force (regenerative torque) by the motor 12 is decreased with reduction in the vehicle speed V. Therefore, it is necessary to apply the total braking force to the wheels FL, FR, RL, RR by the control fluid pressure braking force, instead of the regenerative braking force. That is, the situation where the first condition has been satisfied is a situation where there is a high possibility that the regenerative braking force is switched (replaced with) to the control fluid pressure braking force, namely a situation where there is a high probability that a brake fluid is required to be discharged by the pumps 37, 47.

At the step S206, the brake ECU 60 determines whether or not the wheel pressures Pwc1 to Pwc4 of the respective wheel cylinders WC1 to WC4 are equal to or larger than a preset wheel pressure Pwcd. Specifically, if the wheel pressures Pwc1 to Pwc4 is equal to or larger than the preset wheel pressure Pwcd, i.e., if a second condition has been satisfied, the brake ECU 60 determines "YES" and then proceeds to a step S208.

Herein, the situation where the second condition has been satisfied is, for example, a situation where the battery has been fully charged until execution of the previous sub-routine and thus the regenerative braking force has been changed, as a result of which the wheel pressures Pwc1 to Pwc4 have become equal to or larger than the preset wheel pressure Pwcd (equal to or larger than the preset wheel pressure) in order to apply the control fluid pressure braking force to the wheels FL, FR, RL, RR. That is, the situation where the second condition has been satisfied is a situation where there is a high possibility that the total braking force with an increased control fluid pressure braking force due to a reduced regenerative braking force (reduced regenerative torque) of the motor 12 has to be applied to the wheels FL, FR, RL, RR, namely a situation where there is a high probability that a brake fluid is required to be discharged by the pumps 37, 47.

On the other hand, if the wheel pressures Pwc1, Pwc2, Pwc3, Pwc4 are smaller than the preset wheel pressure Pwcd, i.e., if the second condition has not been satisfied, the brake ECU 60 determines "NO" and then ends execution of the sub-routine for controlling of the control fluid pressure braking force. Subsequently, the brake ECU 60 returns to the cooperative control program and then ends execution of the program for the moment. Herein, if the brake ECU 60 determines "NO" at both the step 204 and the step S206, this is a case where both the first condition and the second condition have not been satisfied.

Figure 5:
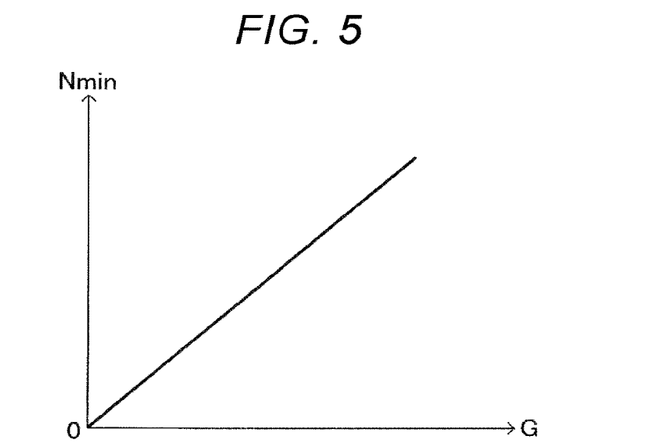
FIG. 5 is a view showing a relationship between a deceleration and a target minimum revolution number of a pump motor in FIG. 2.

At the step S208, the brake ECU 60 (reduction amount setting unit 62) determines a target minimum revolution number Nmin of the pump motor M by referring to the deceleration-minimum revolution number map shown in FIG. 5. Specifically, the brake ECU 60 determines (estimates) a deceleration G to be generated on the vehicle, in accordance with the master cylinder pressure inputted from the pressure sensor P or the stroke amount of the brake pedal 21 inputted from the pedal stroke sensor 21*a* as the brake operation amount. Herein, the deceleration G to be generated on the vehicle and the master cylinder pressure or stroke amount have a relationship, in which the larger the master cylinder pressure or stroke amount is, the larger the deceleration G becomes whereas the smaller the master cylinder pressure or stroke amount is, the smaller the deceleration G becomes. Therefore, the brake ECU 60 can more accurately estimate (determine) the deceleration G using the master cylinder pressure or stroke amount inputted thereto.

Then, the brake ECU 60 (reduction amount setting unit 62) determines the target minimum revolution number Nmin corresponding to the deceleration G, i.e., a reduction amount of the revolution number indicative of a difference between the revolution number Nd and the target minimum revolution number Nmin, using the determined deceleration G and also referring to the deceleration-minimum revolution number map shown in FIG. 5. Herein, the target minimum revolution number Nmin and the deceleration G have, for example, a proportional relationship, in which the larger the deceleration G is, the larger the target minimum revolution number Nmin becomes whereas the smaller the deceleration G is, the smaller the target minimum revolution number Nmin becomes. Alternatively, instead of referring to the map in FIG. 5, for example, a table or calculation equation may be employed upon determination of the target minimum revolution number Nmin corresponding to the deceleration G.

If the target minimum revolution number Nmin of the pump motor M is determined at the step S208, the brake ECU 60 proceeds to the step S210. At the step S210, the brake ECU 60 reduces the revolution number Nd of the pump motor M to the target minimum revolution number Nmin determined at the step S208. In this case, the brake ECU 60 (reduction amount setting unit 62) reduces the revolution number Nd of the pump motor M to the target minimum revolution number Nmin during a preset period of time from a timing, at which the revolution number of the pump motor M is started to be reduced. Then, the brake ECU 60 drives the pump motor M to rotate at the target minimum revolution number Nmin. In this case, as the pump motor M rotates at the target minimum revolution number Nmin, the pumps 37, 38 become a state where the pumps 37, 38 can supply a fluid pressure to the wheel cylinders WC1 to WC4. However, if the step processing of the step S210 is executed, the determination processing at the step S202 is that the fluid pressure control valves 31, 41 are in the differential pressure elimination state. Therefore, for example, the brake ECU 60 returns (circulates) a fluid pressure (brake fluid), which is supplied from the pumps 37, 47, to the pressure adjustment reservoirs 34, 44 by adjusting a current to be applied to the pressure decrease control valves 35, 36, 45, 46.

If the revolution number of the pump motor M is limited to the target minimum revolution number Nmin at the step S210, the brake ECU 60 ends execution of the sub-routine for controlling the control fluid pressure braking force. Then, the brake ECU 60 returns to the cooperative control program and then ends execution of the program for the moment.

Again returning to the cooperative control program of FIG. 3, if the difference is, for example, "0" at the step S114, i.e., if the change in the regenerative braking force is not detected, the brake ECU 60 determines "NO" and then proceeds to a step S118. At the step S118, the brake ECU 60 stops controlling the control fluid pressure braking force by the sub-routine for controlling of the control fluid pressure braking force as described above. Then, the brake ECU 60 ends execution of the cooperative control program for the moment.

Herein, the fact that the brake ECU 60 detects the change in the regenerative braking force at the step S114 and then controls the control fluid pressure braking force at the step S116 can mean that controlling of the control fluid pressure braking force for reducing the revolution number of the pump motor M is executed when both the regenerative braking force and the control fluid pressure braking force are at least applied.

Next, operation of the regenerative brake device A and the hydraulic brake device B as the brake ECU 60 executes the cooperative control program and the sub-routine for controlling of the control fluid pressure braking force as described above will be described with reference to FIGS. 6 to 9.

Figure 6:
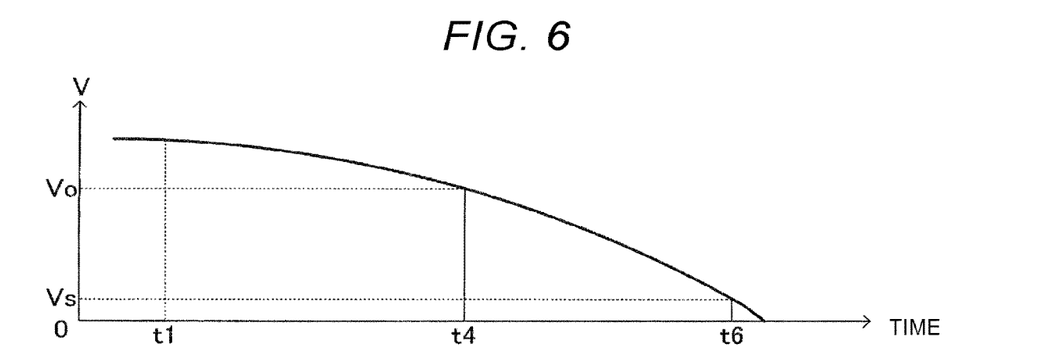
FIG. 6 is a time chart showing a change in vehicle speed after initiation of braking.
Figure 7:
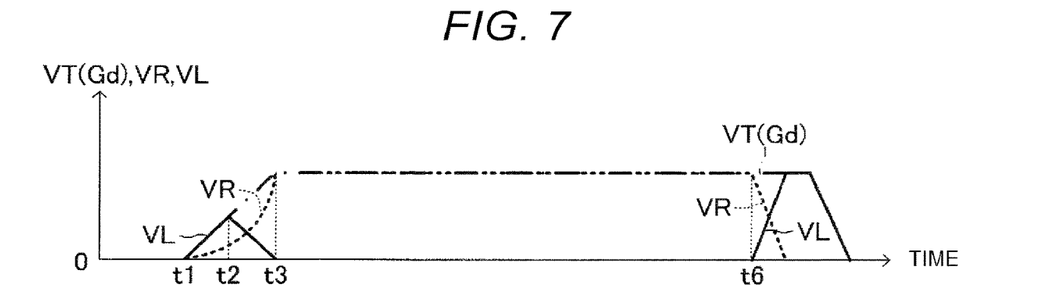
FIG. 7 is a time chart showing a relationship between a total braking force, a regenerative braking force and a controlled hydraulic braking force.

As shown in FIG. 6, if a driver in a vehicle during travelling depresses the brake pedal 21 and thus initiates braking at a timing t1, the vehicle speed V of the vehicle initiates to be reduced. In this case, as shown by a one-dotted chain line in FIG. 7, the brake ECU 60 calculates the target total braking force Ftb* (target deceleration Gd) corresponding to the master cylinder pressure as the brake operation amount and also calculates the target regenerative braking force Frb*. Then, as shown in FIG. 7, applying the regenerative braking force VR to the wheels FL, FR, RL, RR accompanying with depression of the brake pedal 21 will be started from the timing t1. However, as shown by a thick broken line in FIG. 7, a delay of increase in the regenerative braking force (regenerative torque) by the motor 12 occurs during a period of time from the timing t1 to a timing t2. Accordingly, an actual regenerative braking force Frb_act (regenerative braking force VR) is insufficient relative to the target total braking force Ftb* (i.e., the target regenerative braking force Frb*). Therefore, the brake ECU 60 executes the sub-routine for controlling of the control fluid pressure braking force, thereby applying the control fluid pressure braking force VL instead of the regenerative braking force VR.

Figure 8:
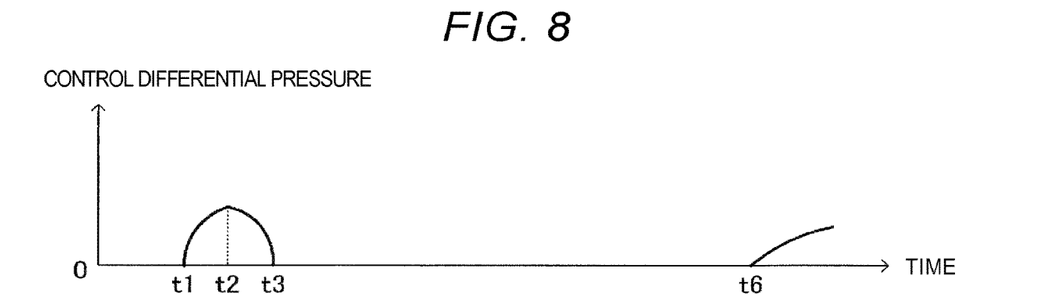
FIG. 8 is a time chart showing a relationship between a differential pressure generation state and a differential pressure elimination state of a fluid pressure control valve in FIG. 2.
Figure 9:
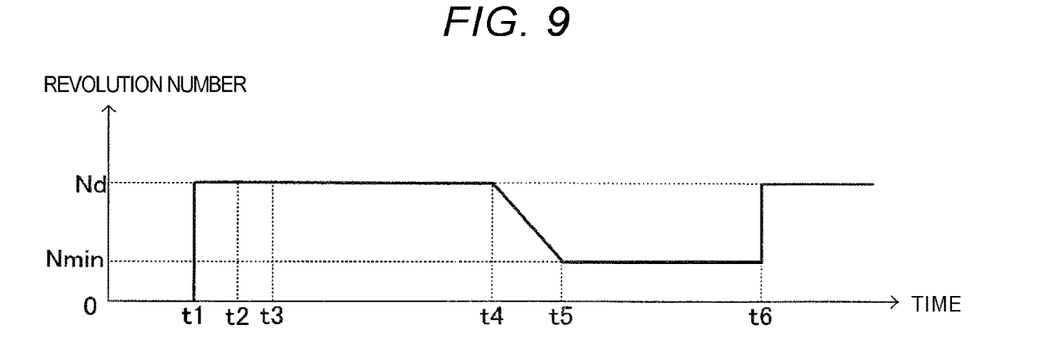
FIG. 9 is time chart showing a change in revolution number of the pump motor in FIG. 2.

The brake ECU 60 switches the fluid pressure control valves 31, 41 to the differential pressure generation state at the timing t1 as shown in FIG. 8 (corresponding to the determination "NO" in the step S202) and also rotates the pump motor M at the revolution number Nd at the timing t1 as shown in FIG. 9, thereby supplying a control fluid pressure from the pumps 37, 47 to the wheel cylinders WC1 to WC4 (corresponding to the step S212). Therefore, as shown by a thick solid line in FIG. 7, the control fluid pressure braking force VL is applied to the wheels FL, FR, RL, RR during the period of time from the timing t1 to the timing t2, and thus a total braking force VT coinciding with the target total braking force Ftb* is applied to the wheels FL, FR, RL, RR. Herein, as shown in FIG. 7, after the timing t2, the regenerative braking force VR is increased until it coincides with the target total braking force Ftb*. Therefore, the brake ECU 60 causes the control fluid pressure braking force VL to be switched to (replaced with) the regenerative braking force VR at the timing t2.

Thus, as shown in FIG. 8, the brake ECU 60 switches the fluid pressure control valves 31, 41 from the differential pressure generation state to the differential pressure elimination state at the timing t2 (corresponding to the determination "YES" at the step S202). More specifically, the brake ECU 60 switches the fluid pressure control valves 31, 41 from a pressure-increasing state to a pressure-maintaining state at the timing t2, and then from the pressure-maintaining state to a pressure-decreasing state until a timing t3. Thus, as shown in FIG. 7, the control fluid pressure braking force VL starts to be decreased from the timing t2, and thus the total braking force VT (target deceleration Gd) by the regenerative braking force VR is applied to the wheels FL, FR, RL, RR.

Thus, if the total braking force VT by the regenerative braking force VR is applied to the wheels FL, FR, RL, RR, the vehicle speed V of the vehicle is gradually reduced. As a result, as shown in FIG. 6, the vehicle speed V becomes smaller than the preset vehicle speed Vo at a timing t4, thereby satisfying the first condition (corresponding to the determination "YES" at the step S204). Therefore, the brake ECU 60 (reduction amount setting unit 62) determines the target minimum revolution number Nmin (i.e., the reduction amount of the revolution number) corresponding to the deceleration G at the timing t4 as shown in FIG. 9 (corresponding to the step S208), and then reduces a revolution number of the pump motor M, which is driving the pumps 37, 47 at the revolution number Nd, to the target minimum revolution number Nmin until a timing t5 (i.e., during a certain period of time from the timing t4 to the timing t6) (corresponding to the step S210). Then, the brake ECU 60 (reduction amount setting unit 62) operates the pump motor M at the target minimum revolution number Nmin after the timing t5.

However, as shown in FIG. 6, at the timing t6 at which the vehicle speed V of the vehicle decreases and becomes a vehicle speed Vs immediately before the vehicle stops, switching from the regenerative braking force VR to the control fluid pressure braking force VL is initiated. At the same time, as shown in FIG. 8, the brake ECU 60 switches the fluid pressure control valves 31, 41 from the differential pressure elimination state to the differential pressure generation state at the timing t6. At this time, as shown in FIG. 9, the brake ECU 60 is rotating the pump motor M at the target minimum revolution number Nmin after the timing t5. Therefore, there is a high probability that a brake fluid is required to be discharged by the pumps 37, 47. Accordingly, in order to apply the control fluid pressure braking force VL to the wheels FL, FR, RL, RR, the brake ECU 60 can operate the pump motor M at the revolution number Nd from the target minimum revolution number Nmin at the timing t6 with good responsiveness. As a result, it is possible to quickly apply the control fluid pressure braking force VL against the reducing regenerative braking force VR. Then, after the timing t6, the control fluid pressure braking force VL is applied to the wheels FL, FR, RL, RR, and the vehicle finally stops.

Also, when the fluid pressure control valves 31, 41 are in the differential pressure elimination state (corresponding to the determination "YES" at the step S202), the brake ECU 60 operates the pump motor M at the target minimum revolution number Nmin if the vehicle speed V is equal to or larger than the preset vehicle speed Vo (corresponding to the determination "NO" at the step S204) and also the wheel pressures Pwc1 to Pwc4 are equal to or larger than the preset wheel pressure Pwcd (corresponding to the determination "YES" at the step S208), for example, if the second condition is satisfied between the timing t5 and the timing t6. Therefore, for example, even if a situation where the regenerative braking force VR is likely to be decreased due to a charged state of the battery (i.e., a situation where there is a high probability that a brake fluid is required to be discharged by the pumps 37, 47) occurs between the timing t5 and the timing t6, the brake ECU 60 can operate the pump motor M at the revolution number Nd from the target minimum revolution number Nmin with good responsiveness in order to apply the control fluid pressure braking force VL to the wheels FL, FR, RL, RR. As a result, it is possible to quickly apply the control fluid pressure braking force VL against the reducing regenerative braking force VR.

As can be understood from the above description, the braking device for vehicles according to the present embodiment includes the pumps 37, 37 for discharging a brake fluid onto the fluid lines Lf, Lr (onto a fluid line) between the master cylinder 23 and the wheel cylinders WC1, WC2, WC3, WC4 of the wheels FL, FR, RL, RR; the pump motor M for driving the pumps 37, 47 in accordance with the target control fluid pressure braking force Fcfb*(n) corresponding to a target wheel pressure, which is a target value of the wheel pressures Pwc1, Pwc2, Pwc3, Pwc4 in the wheel cylinders WC1, WC2, WC3, WC4; the hydraulic brake device B as a hydraulic brake unit for applying a control fluid pressure, which is generated from a fluid pressure by the pumps 37, 38, to the wheel cylinders WC1, WC2, WC3, WC4; the fluid pressure control valves 31, 41 for causing the controllable differential pressure, which is generated between the master cylinder 23 side and the wheel cylinder WC1, WC2, WC3, WC4 side thereof by the control fluid pressure, to become a maintained state or decreased state; the brake ECU 60 as a motor control unit for reducing a revolution number of the pump motor M when the controllable differential pressure becomes the maintained state or decreased state by the fluid pressure control valves 31, 41; and the reduction amount setting unit 62 for setting a reduction amount of the revolution number of the pump motor M in the maintained state or decreased state of the controllable differential pressure, in such a manner that during a certain period of time from the timing t4, at which the revolution number Nd of the pump motor M starts to be reduced by the brake ECU 60, to the timing t6, the reduction amount of the revolution number of the pump motor M is decreased as a probability that a brake fluid is required to be discharged by the pumps 37, 47 becomes higher. Herein, in the present embodiment, the reduction amount setting unit 62 sets the target minimum revolution number Nmin by subtracting the set reduction amount from the revolution number Nd. Meanwhile, in the present embodiment, the braking device for vehicles includes the regenerative brake device A as the regenerative brake unit for generating the regenerative braking force VR on the left and right front wheels FL, FR of the wheels FL, FR, RL, RR in accordance with a brake operation state, in addition to the hydraulic brake device B as the hydraulic brake unit.

In this case, the reduction amount setting unit 62 determines that the larger the deceleration G of the vehicle becomes, the higher the probability is. Herein, in the present embodiment, the reduction amount setting unit 62 sets the target minimum revolution number Nmin relative to the deceleration G in such a manner that the target minimum revolution number Nmin is increased with increase in the deceleration G whereas the target minimum revolution number Nmin is decreased with decrease in the deceleration G.

Due to these configurations, in a situation where the deceleration G generated on the vehicle is large to some extent, i.e., in a situation where there is a high probability that a brake fluid is required to be discharged by the pumps 37, 47 and thus a high possibility that the control fluid pressure braking force VL is increased by again driving the pumps 37, 47, the reduction amount setting unit 62 (brake ECU 60) can increase a revolution number of the pump motor M to the revolution number Nd with good responsiveness without excessively decreasing the target minimum revolution number Nmin, by setting the reduction amount of the revolution number of the pump motor M to be smaller. Therefore, it is possible to increase the control fluid pressure by the pumps 37, 47 with good responsiveness and thus to quickly apply the control fluid pressure braking force VL. Also, in a situation where the deceleration G generated on the vehicle is small, i.e., in a situation where there is a low probability that a brake fluid is required to be discharged by the pumps 37, 47 and thus a low possibility that the control fluid pressure braking force VL is increased by again driving the pumps 37, 47, it is possible to appropriately inhibit deterioration of the pump motor M by setting the target minimum revolution number Nmin to be smaller (by setting the reduction amount of the revolution number of the pump motor M to be larger).

Further, in this case, the reduction amount setting unit 62 can set the reduction amount if one (at least one) of the first condition that the vehicle speed V of the vehicle is smaller than the preset vehicle speed Vo (smaller than a preset vehicle speed) and the second condition that the wheel pressures Pwc1, Pwc2, Pwc3, Pwc4 applied to the respective wheel cylinders WC1, WC2, WC3, WC4 are equal to or larger than the preset wheel pressure Pwcd (equal to or larger than a preset wheel pressure) is satisfied.

Therefore, in a situation where one of the first condition and the second condition is satisfied, i.e., in a situation where there is a high probability that a brake fluid is required to be discharged by the pumps 37, 47 and thus a high possibility that the control fluid pressure braking force VL is increased, the reduction amount setting unit 62 (brake ECU 60) can increase a revolution number of the pump motor M to the revolution number Nd with good responsiveness without excessively decreasing the target minimum revolution number Nmin, by setting the reduction amount of the revolution number of the pump motor M to be smaller. Therefore, it is possible to increase the control fluid pressure by the pumps 37, 47 with good responsiveness and thus to quickly apply the control fluid pressure braking force VL. Also, in the situation where there is a high possibility that the control fluid pressure braking force VL is increased, it is possible to reduce a frequency (period of time), at which the pump motor M is unnecessarily operated at a high revolution number, without impairing responsiveness, by operating the pump motor M at the target minimum revolution number Nmin, which is obtained by subtracting the reduction amount set in accordance with the deceleration G (the probability that a brake fluid is required to be discharged by the pumps 37, 47) from the revolution number Nd, which is a high revolution number, for example, as compared with a case where the pump motor M is continuously operated at the revolution number Nd. As a result, it is possible to satisfactorily inhibit deterioration of the pump motor M.

(First Modification)

According to the foregoing embodiment, in the subroutine for controlling of the control fluid pressure braking force, the step processing of the step S204 determines whether or not the vehicle speed V of the vehicle is smaller than the preset vehicle speed Vo, and the step processing of the step S206 following the determination "NO" at the step S204 determines whether or not the wheel pressures Pwc1 to Pwc4 of the wheel cylinders WC1 to WC4 are equal to or larger than the preset wheel pressure Pwcd. That is, in the foregoing embodiment, the pump motor M is operated at the target minimum revolution number Nmin if any one of the first condition and the second condition is satisfied.

Figure 10:
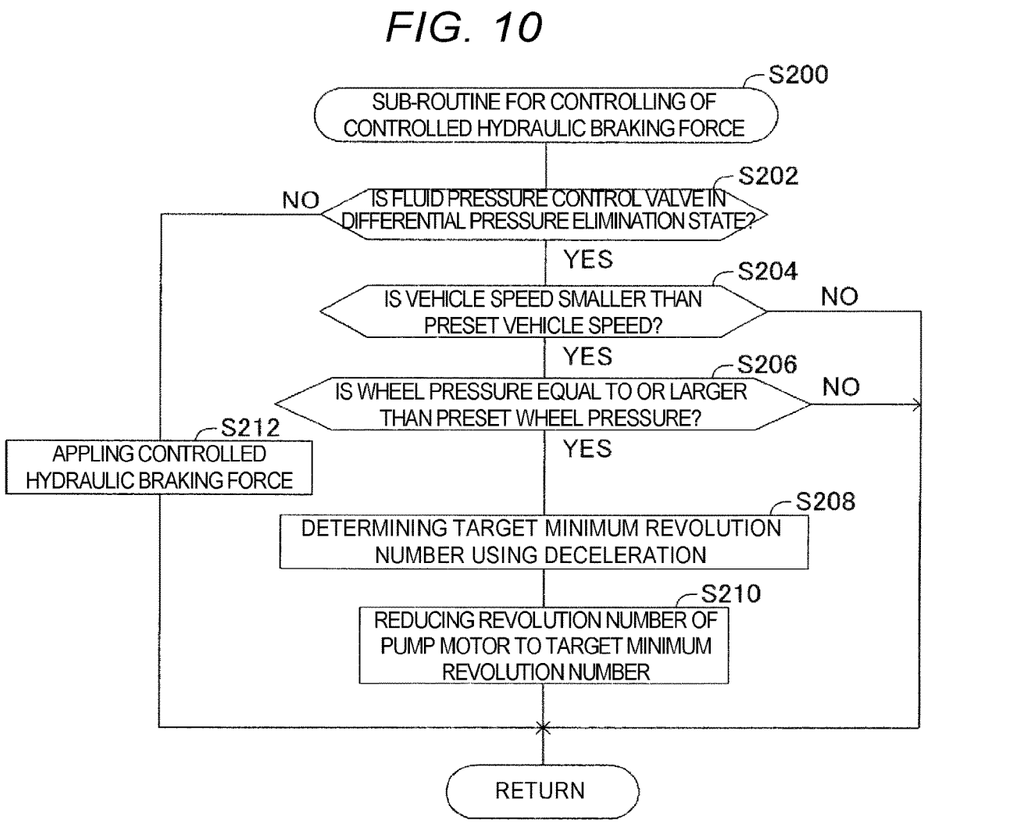
FIG. 10 is a flow chart of a program (sub-routine) executed by the brake ECU shown in FIG. 1, but according to a first modification of the embodiment.

Alternatively, as shown in FIG. 10, the step processing of the step S206 may be executed following the determination "YES" by the step processing of the step S204. That is, in this case, the pump motor M can be operated at the target minimum revolution number Nmin if both the first condition and the second condition are satisfied, which is encompassed by the case where at least one thereof is satisfied. Thus, as shown in FIGS. 7 to 9, in particular, when the regenerative braking force VR is switched to (replaced with) the control fluid pressure braking force VL immediately before stop of the vehicle as described above, it is possible to operate the pump motor M at the revolution number Nd from the target minimum revolution number Nmin with good responsiveness if both the first condition and the second condition are satisfied. As a result, it is possible to quickly apply the control fluid pressure braking force VL against the reducing regenerative braking force VR.

(Second Modification)

In the present embodiment, the brake ECU 60 determines only whether or not the wheel pressures Pwc1 to Pwc4 of the wheel cylinders WC1 to WC4 are equal to or larger than the preset wheel pressure Pwcd by the step processing of the step S206. Alternatively, if the step processing of the step S206 determines that the second condition is satisfied, the brake ECU 60 may also determine whether the pressure increase control valves 32, 33, 42, 43 and the pressure decrease control valves 35, 36, 45, 46 are controlled to an interrupted state to maintain the wheel pressures Pwc1, Pwc2, Pwc3, Pwc4 (maintained state) or the pressure decrease control valves 35, 36, 45, 46 are controlled to a communicated state to decrease the wheel pressures Pwc1, Pwc2, Pwc3, Pwc4 (decreased state).

Figure 11:
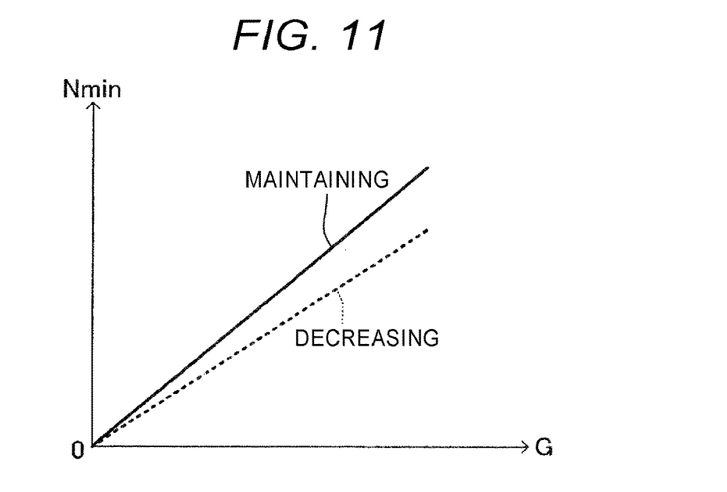
FIG. 11 is a view showing a relationship between a deceleration and a target minimum revolution number of a pump motor in FIG. 2, but according to a second modification of the embodiment.

Also, in this case, when the target minimum revolution number Nmin of the pump motor M is determined at the step S208, the brake ECU 60 (reduction amount setting unit 62) can set the target minimum revolution number Nmin to be different between the maintained state and the decreased state, by referring to a deceleration-minimum revolution number map shown in FIG. 11 and also using the deceleration G. That is, if at least the second condition is satisfied, the reduction amount setting unit 62 sets the reduction amount to be smaller when the wheel pressures Pwc1 to Pwc4 are maintained than when the wheel pressures Pwc1 to Pwc4 are decreased. In other words, for example, the target minimum revolution number Nmin when the wheel pressures Pwc1 to Pwc4 are maintained based on the target control fluid pressure braking force Fcfb*(n) is determined to be larger than the target minimum revolution number Nmin when the wheel pressures Pwc1 to Pwc4 are decreased based on the target control fluid pressure braking force Fcfb*(n).

When the wheel pressures Pwc1, Pwc2, Pwc3, Pwc4 are in the maintained state, an increased control fluid pressure braking force VL is required afterward. As a result, there is a high possibility that the wheel pressures Pwc1, Pwc2, Pwc3, Pwc4 are increased. That is, there is a high probability that a brake fluid is required to be discharged by the pumps 37, 47. On the other hand, when the wheel pressures Pwc1, Pwc2, Pwc3, Pwc4 are in the decreased state, a gradually decreased control fluid pressure braking force VL is required. As a result, there is a high possibility that the wheel pressures Pwc1, Pwc2, Pwc3, Pwc4 are decreased. That is, there is a low probability that a brake fluid is required to be discharged by the pumps 37, 47.

For this reason, as shown in FIG. 11, the target minimum revolution number Nmin when the wheel pressures Pwc1, Pwc2, Pwc3, Pwc4 are maintained is determined to be larger than the target minimum revolution number Nmin when the wheel pressures Pwc1, Pwc2, Pwc3, Pwc4 are decreased. Therefore, when the wheel pressures Pwc1, Pwc2, Pwc3, Pwc4 are increased from the maintained state, it is possible to operate the pump motor M at the revolution number Nd from the target minimum revolution number Nmin with good responsiveness. As a result, it is possible to quickly apply the control fluid pressure braking force VL to the wheels FL, FR, RL, RR against the reducing regenerative braking force VR. Also, when the wheel pressures Pwc1, Pwc2, Pwc3, Pwc4 are in the decreased state, it is possible to operate the pump motor M at a reduced target minimum revolution number Nmin. As a result, it is possible to effectively inhibit deterioration of the pump motor M.

(Third Modification)

In the foregoing embodiment, the sub-routine for controlling of the control fluid pressure braking force is provided with the step S204 and the step S206 for determining whether or not the first condition and the second condition are satisfied. Alternatively, the step S204 and the step 206 may be omitted. Also, in this case, when the fluid pressure control valves 31, 41 have been switched from the differential pressure generation state to the differential pressure elimination state and also transition (switching) of the fluid pressure control valves 31, 41 from the maintained state to the decreased state is completed, the revolution number Nd of the pump motor M may be reduced to the target minimum revolution number Nmin (target revolution number). Hereinafter, the third modification will be described in detail, but the same components as those of the foregoing embodiment are denoted by the same reference numerals and the descriptions thereof will be omitted.

Figure 12:
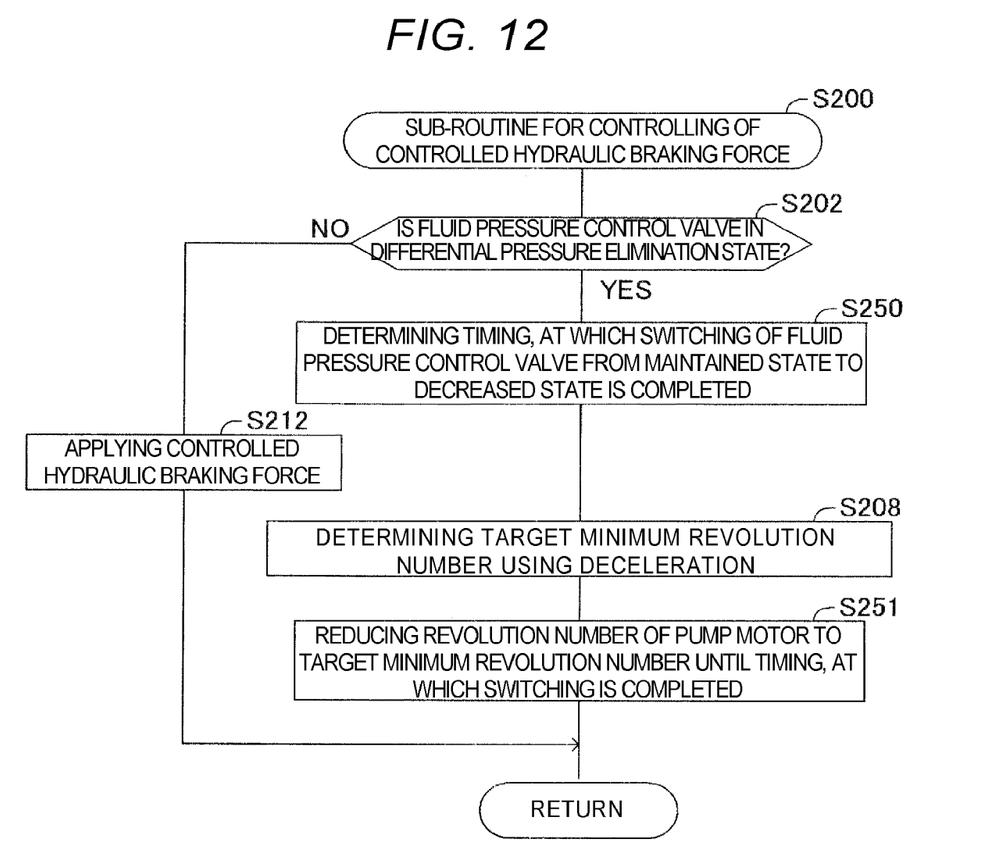
FIG. 12 is a flow chart of a program (sub-routine) executed by the brake ECU shown in FIG. 1, but according to a third modification of the embodiment.

As shown in FIG. 12, the third modification differs from the foregoing embodiment in that the step S204 and the step 204 are omitted, a step S250 is added and also the step S210 is changed to a step S251. At the step S250, the brake ECU 60 determines (estimates) a timing (e.g., the timing t3 shown in FIG. 8), at which switching of the fluid pressure control valves 31, 41 to the decreased state is completed, based on a timing (e.g., the timing t2 shown in FIG. 8), at which the fluid pressure control valves 31, 41 have been switched to the maintained state, in consideration of a switching responsiveness of the fluid pressure control valves 31, 41, a flow rate property of the pressure decrees control valves 35, 36, 45, 46 and the like. Then, the brake ECU 60 determines the target minimum revolution number Nmin (target revolution number) of the pump motor M at the next step S208 and then proceeds to the step S251.

At the step S251, the brake ECU 60 reduces the revolution number Nd of the pump motor M to the target minimum revolution number Nmin (target revolution number) determined at the step S208 until the timing (e.g., the timing t3 shown in FIG. 8), at which switching of the fluid pressure control valves 31, 41 to the decreased state is completed and which is determined (estimated) at the step S250. That is, as shown in FIG. 13, at the timing (timing t3), at which switching of the fluid pressure control valves 31, 41 to the decreased state is completed, the brake ECU 60 operates the pump motor M at the target minimum revolution number Nmin.

Therefore, according to the third modification, the brake ECU 60 reduces the revolution number Nd of the pump motor M to the target minimum revolution number Nmin (target revolution number) corresponding to a reduction amount set by the reduction amount setting unit 62, until transition from the maintained state of the controllable differential pressure to the decreased state of the controllable differential pressure in the differential pressure elimination state is completed by the fluid pressure control valves 31, 41, more specifically, until the timing t3, at which the fluid pressure control valves 31, 41 which have been switched to the maintained state at the timing t2 completes a decrease in pressure. Thus, for example, as shown by a one-dotted chain line in FIG. 13, it is possible to operate the pump motor M at the target minimum revolution number Nmin from the timing t3 prior to the timing t5, as compared with a case where the pump motor M is operated at the revolution number Nd until the timing t5. Therefore, it is possible to reduce a period of time, during which pump motor M is operated at the revolution number Nd higher than the target minimum revolution number Nmin. As a result, it is possible to better inhibit deterioration of the pump motor M.

Herein, according to the third modification, the pump motor M is operated at the target minimum revolution number Nmin at the timing t3, at which switching of the fluid pressure control valves 31, 41 to the decreased state is completed. However, if a period of time (reduction section), during which the revolution number Nd is reduced to the target minimum revolution number Nmin, is appropriately set and also the target minimum revolution number Nmin is varied in accordance with the deceleration G, the reduction amount of the revolution number of the pump motor M per unit time, i.e., a reduction gradient of the revolution number of the pump motor M may be arbitrarily set.

Figure 13:
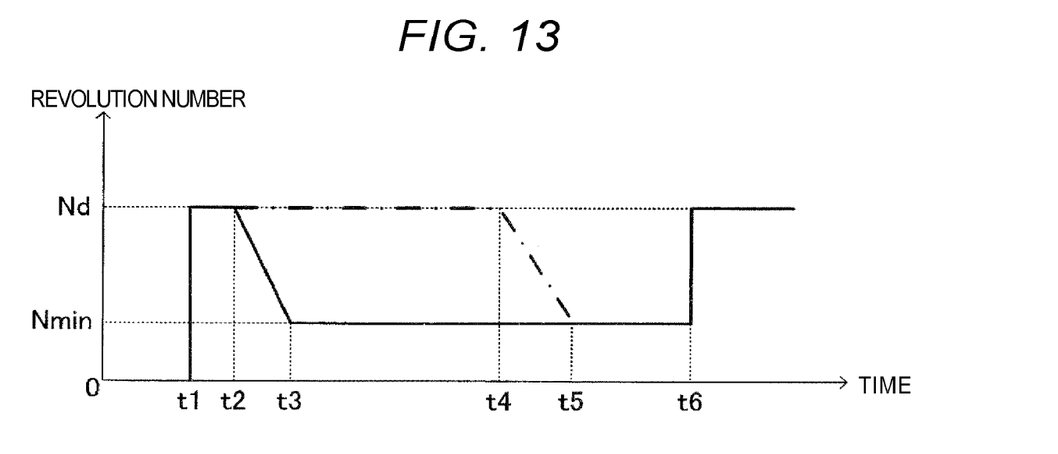
FIG. 13 is a time chart showing a change in revolution number of the pump motor in FIG. 2, but according to the third modification of the embodiment.

Specifically, for example, in a case where reducing the revolution number Nd of the pump motor M to the target minimum revolution number Nmin is started at the timing t2 in FIG. 13, an arbitrary timing t7 (not shown) is set between the timing t3 and the timing t6 and then the pump motor M is operated at the target minimum revolution number Nmin at the timing t7. In this case, if the target minimum revolution numbers Nmin at the timing t3 and the timing t7 are the same, the reduction gradient becomes smaller (gentler) when operating the pump motor M at the target minimum revolution number Nmin at the timing t7. On the other hand, if the target minimum revolution number Nmin at the timing t7 is smaller than that at the timing t3 (if the deceleration G is smaller), the reduction gradient becomes larger (sharper) when operating the pump motor M at the target minimum revolution number Nmin at the timing t7.

Therefore, if the reduction section (period of time) is appropriately set and also the target minimum revolution number Nmin is determined in accordance with the deceleration G, the reduction gradient becomes smaller or larger depending on a width of the reduction section and an increase or decrease in the target minimum revolution number Nmin. On the basis of this, for example, if it is difficult to increase or decrease the reduction section as in the third modification, a magnitude of the reduction gradient can be limited by setting a range of the target minimum revolution number Nmin. Further, by limiting the magnitude of the reduction gradient within an appropriately set range in this way, it is possible to well inhibit deterioration of the pump motor M from occurring due to operation of the pump motor M (an increase or decrease in the revolution number thereof).

The present invention is not limited to the foregoing embodiment and the foregoing modifications upon implementation thereof, and accordingly, various modifications thereof can be made without departing from the object of the present invention.

For example, in the foregoing embodiment and the foregoing modifications, the pump motor M is operated at the target minimum revolution number Nmin by reducing the revolution number Nd of the pump motor M to the target minimum revolution number Nmin. In this case, if the deceleration G is "0", the target minimum revolution number Nmin can be set to "0". Therefore, it is possible to stop the pump motor M when the control fluid pressure braking force is not required.

Also, in the foregoing embodiment and the foregoing modifications, the braking device for vehicles is configured to be applied to a hybrid vehicle and thus to have the regenerative brake device A. Alternatively, the braking device for vehicles may be applied to any vehicles other than the hybrid vehicle, i.e., a vehicle provided with no regenerative brake device A and thus with only the hydraulic brake device B. In this case, the total braking force is constituted of the base fluid pressure braking force and the control fluid pressure braking force, thereby appropriately stopping the vehicle. Further, if the total braking force is constituted of the base fluid pressure braking force, i.e., if the control fluid pressure braking force is not required, the pump motor M of the hydraulic brake device B can be operated at the target minimum revolution number Nmin like the foregoing embodiment and the foregoing modifications, thereby operating the pump motor M at the revolution number Nd from the target minimum revolution number Nmin with good responsiveness and also to well inhibit deterioration of the pump motor M.

The invention claimed is:

1. A braking device for vehicles, comprising:
   a pump for discharging a brake fluid onto a fluid line between a master cylinder and wheel cylinders of wheels;
   a pump motor for driving the pump in accordance with a target wheel pressure, which is a target value of wheel pressures in the wheel cylinders;
   a hydraulic brake unit for applying a control fluid pressure, which is generated from a fluid pressure by the pump, to the wheel cylinders;
   a fluid pressure control valve for causing a controllable differential pressure, which is generated between a master cylinder side and a wheel cylinder side thereof by the control fluid pressure, to become a maintained state or decreased state;
   a motor control unit for reducing a revolution number of the pump motor when the controllable differential pressure becomes the maintained state or decreased state by the fluid pressure control valve; and
   a reduction amount setting unit for setting a reduction amount of the revolution number of the pump motor in the maintained state or decreased state of the controllable differential pressure, in such a manner that during a predetermined period of time from a timing, at which the revolution number of the pump motor starts to be reduced by the motor control unit, the reduction amount of the revolution number of the pump motor is decreased as a probability that the brake fluid is required to be discharged by the pump becomes higher, the reduction amount setting unit configured to determine that the larger a deceleration of the vehicle becomes, the higher the probability is.

2. A braking device for vehicles, comprising:
   a pump for discharging a brake fluid onto a fluid line between a master cylinder and wheel cylinders of wheels;
   a pump motor for driving the pump in accordance with a target wheel pressure, which is a target value of wheel pressures in the wheel cylinders;
   a hydraulic brake unit for applying a control fluid pressure, which is generated from a fluid pressure by the pump, to the wheel cylinders;
   a fluid pressure control valve for causing a controllable differential pressure, which is generated between a master cylinder side and a wheel cylinder side thereof by the control fluid pressure, to become a maintained state or decreased state;
   a motor control unit for reducing a revolution number of the pump motor when the controllable differential pressure becomes the maintained state or decreased state by the fluid pressure control valve; and
   a reduction amount setting unit for setting a reduction amount of the revolution number of the pump motor in the maintained state or decreased state of the controllable differential pressure, in such a manner that during a predetermined period of time from a timing, at which the revolution number of the pump motor starts to be reduced by the motor control unit, the reduction amount of the revolution number of the pump motor is decreased as a probability that the brake fluid is required to be discharged by the pump becomes higher, the reduction amount setting unit configured to set the reduction amount if at least one of a first condition that a vehicle speed of the vehicle is smaller than a preset vehicle speed and a second condition that wheel pressures applied to the respective wheel cylinders are equal to or larger than a preset wheel pressure is satisfied.

3. The braking device for vehicles according to claim 2, wherein the reduction amount setting unit is configured:
   when at least the second condition is satisfied,
   to set the reduction amount to be smaller when the wheel pressure is maintained than when the wheel pressure is decreased.

4. A braking device for vehicles, comprising:
   a pump for discharging a brake fluid onto a fluid line between a master cylinder and wheel cylinders of wheels;
   a pump motor for driving the pump in accordance with a target wheel pressure, which is a target value of wheel pressures in the wheel cylinders;
   a hydraulic brake unit for applying a control fluid pressure, which is generated from a fluid pressure by the pump, to the wheel cylinders;
   a fluid pressure control valve for causing a controllable differential pressure, which is generated between a master cylinder side and a wheel cylinder side thereof by the control fluid pressure, to become a maintained state or decreased state;
   a motor control unit for reducing a revolution number of the pump motor when the controllable differential pressure becomes the maintained state or decreased state by the fluid pressure control valve; and
   a reduction amount setting unit for setting a reduction amount of the revolution number of the pump motor in the maintained state or decreased state of the controllable differential pressure, in such a manner that during a predetermined period of time from a timing, at which the revolution number of the pump motor starts to be reduced by the motor control unit, the reduction amount of the revolution number of the pump motor is decreased as a probability that the brake fluid is required to be discharged by the pump becomes higher,
   wherein the motor control unit is configured to reduce the revolution number of the pump motor to a target revolution number corresponding to the reduction amount set by the reduction amount setting unit, until transition of the controllable differential pressure from the maintained state to the decreased state is completed by the fluid pressure control valve.

* * * * *